United States Patent [19]

McMurry

[11] Patent Number: 4,953,146
[45] Date of Patent: Aug. 28, 1990

[54] STREAMLINE SEISMIC STREAMER-CABLE CASING

[75] Inventor: Alan D. McMurry, Friendswood, Tex.

[73] Assignee: Western Atlas International, Inc., Houston, Tex.

[21] Appl. No.: 477,171

[22] Filed: Jan. 23, 1990

Related U.S. Application Data

[63] Continuation of Ser. No. 279,761, Dec. 5, 1988, abandoned.

[51] Int. Cl.5 .......................................... H04B 11/00
[52] U.S. Cl. .................................... 367/191; 367/154; 405/171
[58] Field of Search ...................... 114/124, 253, 270; 405/171, 172, 186, 187; 441/28, 29; 248/73, 74.1, 74.2, 74.3, 74.4, 74.5; 367/16–20, 106, 130, 153, 154, 169, 191; 174/101.5, DIG. 2

[56] References Cited

U.S. PATENT DOCUMENTS

| 4,086,561 | 4/1978 | Wooddy, Jr. ............... 367/191 |
| 4,204,188 | 5/1980 | Weichart et al. ............ 367/154 |
| 4,291,855 | 9/1981 | Schenkel et al. ............ 248/74.1 |
| 4,500,980 | 2/1985 | Copeland .................... 367/154 |
| 4,618,114 | 10/1986 | McFarland .............. 248/74.2 X |
| 4,783,029 | 11/1988 | Geppert et al. ............. 248/74.1 |

FOREIGN PATENT DOCUMENTS

| 0001541 | 4/1979 | European Pat. Off. ........... 405/171 |
| 3019303 | 11/1981 | Fed. Rep. of Germany ..... 248/74.2 |

Primary Examiner—Brian S. Steinberger
Attorney, Agent, or Firm—Barry C. Kane

[57] ABSTRACT

An apparatus is disclosed for balancing a seismic streamer cable. The housing is comprised of a first and a second valve coupled about the streamer cable. Each valve has a clasp adapted to engage a socket on the other valve to ridigly fasten the valves together about the streamer cable. The housing surrounds and retains weights applied to the streamer cable. An alternate embodiment is disclosed where the weight is integral with each valve. The exterior of the housing is designed to produce laminar flow conditions for the fluid passing over the housing as the cable is under tow, reducing ambient noise detected by the sensors within the streamer cable.

11 Claims, 2 Drawing Sheets

STREAMLINE SEISMIC STREAMER-CABLE CASING

This is a continuation of copending application Ser. No. 07/279,761 filed on 12/5/88 now abandoned.

BACKGROUND OF THE INVENTION

1. Field of the Invention

This invention relates generally to marine seismic exploration, and particularly to a method and apparatus for reducing turbulent noise associated with cable balancing weights.

2. Discussion of the Related Art

Often in marine seismic exploration, an acoustic source and a seismic streamer cable are towed behind a vessel steaming above a subsurface zone of interest. At periodic intervals the acoustic source is activated, generating an acoustic signal which propagates through the earth and is reflected towards the surface by acoustic impedance differences existing in the subsurface. The reflected acoustic signals are received by detectors positioned along the length of the streamer cable positioned behind the vessel. The detectors may generate an optical or electrical signal indicative of the detected acoustic signal which is sent up the streamer cable to a remote recording and storage device on the vessel.

Both the acoustic source and the streamer cable are towed at a predetermined depth in the water to maximize signal strength and to reduce the noise floor of the received signals. In order to maintain the depth of the streamer cable, cable depth controllers (birds) and lead weights are necessarily employed. The lead weights are generally attached to the cable by a heavy-duty strength linen tape. The lead weights, usually in one pound sheets, are molded to the outer circumference of the cable and held fast by the tape. Often the layers of weight and tape are substantial, radically increasing the diameter of the cable several millimeters and up to over a centimeter within a lateral distance of less than two inches. In other words, rise to run ratio is great and the profile of the cable forms a steep profile. This sharp increase in the cable diameter causes turbulent flow as the streamer cable glides through the water. This turbulent flow is one factor which contributes to the noise floor present in the streamer cable.

Another disadvantage in the present technique of taping weight to the cable is expediency in application. The streamer cable must be reeled in to the point where the weight is to be applied. The one pound sheets of weight are formed to the cable exterior by hand and retained there by wrapping the weight in the linen tape. The fixing of the weight may take on the order of five minutes to assure the weight will not be lost. The cable is laid out to test if the appropriate amount of weight was applied. This procedure may be repeated several times until the cable is properly balanced.

Yet another disadvantage to the procedure of taping weights to the cable exterior is that the lead weights are often lost. Because the cable is emersed in water and the tape is exposed to the turbulent flow, the tape often unwraps, dropping the weight. Additionally, as the tape unravels, the trailing strand of tape introduces noise which is detected by the hydrophones adjacent the trailing tape.

It is an object of this invention to provide an exterior weight which reduces the noise floor caused by turbulent flow.

It is another object of this invention to provide an apparatus for applying weight to the exterior of the streamer cable in a fast and efficient manner.

It is another object of this invention to provide a device to retain the weight on the cable without requiring tape.

SUMMARY OF THE INVENTION

The instant invention is a housing or casing adapted to be received along the cable exterior. The housing has a streamlined exterior and is designed to retain cable weights attached to the cable. Alternatively, the housing may have the weights integral with the housing shell. The streamline design produces laminar flow conditions over the housing and reduces turbulent flow further down the cable. Laminar flow conditions produce less ambient noise than does turbulent flow conditions near the cable.

The housing is comprised of two pieces or valves, each identical to the other and having a clasp and a socket. The clasp of one valve is received by the socket of the other valve and placed around the cable. The opposite clasp and socket are mated, closing the valves about the cable exterior. The inside diameter at each end of the housing is smaller than the outside diameter of the cable. Thus the housing is held at a location on the cable by clamping about the cable diameter.

It is preferred that the housing be manufactured from a high strength noncorrosive material such a polypropolene homopolymer, certain polycarbonate plastics or other such material.

BRIEF DESCRIPTION OF THE DRAWING FIGURES

For a more complete understanding of the present invention and the further objects and advantages thereof, reference may now be made to the following description taken in conjunction with the drawings, wherein:

FIG. 1 generally illustrates a seismic vessel towing an acoustic source and streamer cable through a body of water;

FIG. 2 provides a perspective view of the weight case of this invention;

DETAILED DESCRIPTION OF A PREFERRED EMBODIMENT

Figure 1:
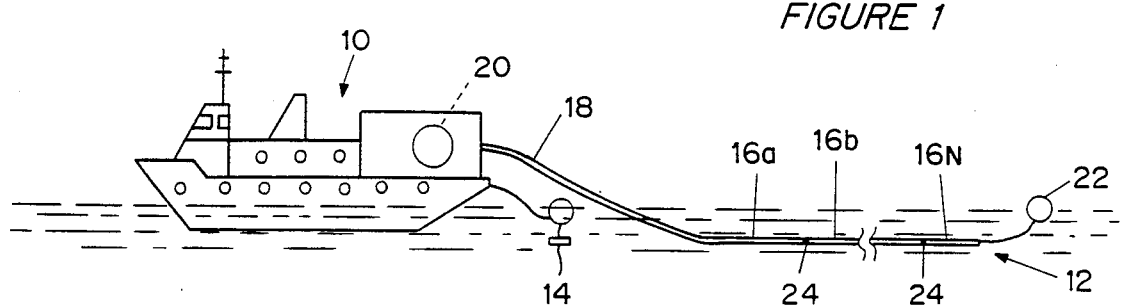

FIG. 1 generally illustrates a seismic vessel towing an acoustic source and streamer cable through a body of water. The seismic vessel 10 pulls at least one seismic streamer cable indicated as 12 extending from the stern or from outriggers from the vessel, and at least one seismic source 14 located proximate the vessel. The streamer cable 12 may consist of a plurality of separate sections $16_a$–$16_n$. The individual sections may range in length between 100 to 300 feet and up to 50 or more sections may be used in commercial operations. The streamer cable 12 is secured to the vessel 10 by a lead-in cable 18 which is attached to a cable storage reel 20 located aboard the vessel. A tail buoy 22 is attached to the distal end of the cable by a long stretch of rope or similar material. The tail buoy may optionally be provided with an acoustic, electromagnetic or visual homing device used to locate the end of the streamer cable.

Each section of the streamer cable contains a plurality of hydrophones well known in the seismic art. The hydrophones are interconnected by a transmission line to a remote recording device located aboard the vessel. In addition the streamer cable contains stress members designed to absorb the tensional stress applied to the cable while in tow. The sensing and strength components are surrounded by a plastic jacket in the form of an elongated tube approximately three inches in outside diameter and having a wall thickness of approximately one-eighth inch. The jacket is preferably filled with a lightweight ballast fluid to render the section neutrally or slightly positively buoyant. When full of fluid, the interior of the jacket is at atmospheric pressure. The cylindrical form of the jacket is maintained by a plurality of bulkheads spaced at intervals within the interior of the jacket: the outside diameter of the bulkheads being slightly larger than the inside diameter of the jacket. Each cable section is interconnected in tandem with the sections on either side by way of couplers shown as 24. Each coupler is comprised of two halves, one each coupled to an end of a streamer cable section $16_n$.

As the streamer cable sections are towed through the body of water, the length of the cable is generally not located at the same depth but is located at different depths along it length. This is caused by the weight of the couplers 24 and other electronic modules at the ends of the cable, drawing down the cable. The fluid within the cable provides buoyancy to the middle portion of each section $16_n$. This difference in buoyancy in the cable is undesirable. As mentioned earlier, several techniques have been employed to tow the entire length of the cable at a constant depth. Cable depth controllers or birds have been used for some time. A controller contains a diving plane remotely controlled to maintain the depth of that portion of the streamer. Lead weights have also been used, taped in place by wraps of linen tape, but this procedure results in increased noise caused by turbulent flow of the water passing the cable.

Figure 2:
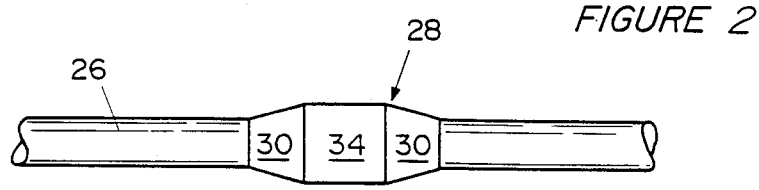

Now refer to FIG. 2 which is a perspective view of the present inventive case. A portion of the seismic streamer cable is indicated as 26. The housing 28 may be attached about the cable at any point along its length. As suggested by the Figure, the housing is generally cylindrical in form, having a tubular passage designed to fit around the cable section body. Tapered surfaces 30 at each end of the housing provide a smooth transition in profile preventing the formation of turbulent flow conditions around the cable as the housing and cable pass through the water. In another embodiment, the housing exterior may be a gently curved surface instead of the tapered surfaces shown in the figure. The purpose is to provide a surface where the flow regime existing over the housing surface is laminar instead of turbulent, since laminar flow creates less ambient noise.

Figure 3:
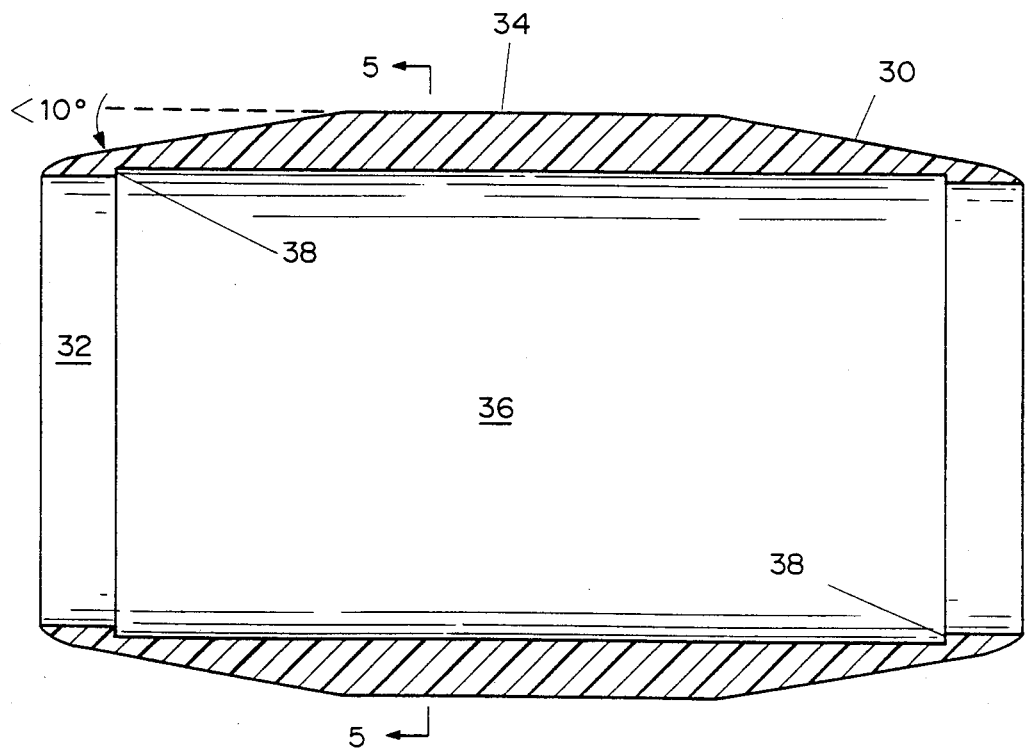
FIG. 3 is a longitudinal cross-section of the weight case of FIG. 2.

FIG. 3 is a longitudinal cross-section of the case of FIG. 2. The tubular passage indicated as 32 is clearly shown as well as the tapered surfaces 30 along the exterior of the housing. The tapered surfaces 30 intersect a cylindrical outer surface 34. It is preferred in one embodiment that the slope of the tapered surface be less than ten degrees from the longitudinal axis of the housing. The tubular passage 32 extending the length of the housing is slightly restricted at each end, the diameter of the restriction is slightly less than the outside diameter of the cable. Just inside each end of the housing, the inside diameter of wall 36 increases, forming a shoulder 38 at the transition. In one embodiment of the invention, the inside diameter of wall 36 is such to allow the one pound lead weight or ballast to be formed to the cable exterior, surrounded by the housing. In another embodiment of this invention, the one pound lead weight or ballast may be incorporated directly into the housing, thus the inside diameter of wall 36 would be substantially equivalent to that of the cable exterior. The larger diameter portion of the wall 36 is also provided so as to allow the housing to be coupled about the cable section while the restricted end portions grip the cable and retain the housing in place. Thus the housing can be coupled to a location on the cable to straddle one or more bulkheads: The shoulder 38 would not slide past a point where a bulkhead was in the cable because of an increase in the cable diameter caused by the bulkhead at the location.

Figure 4:
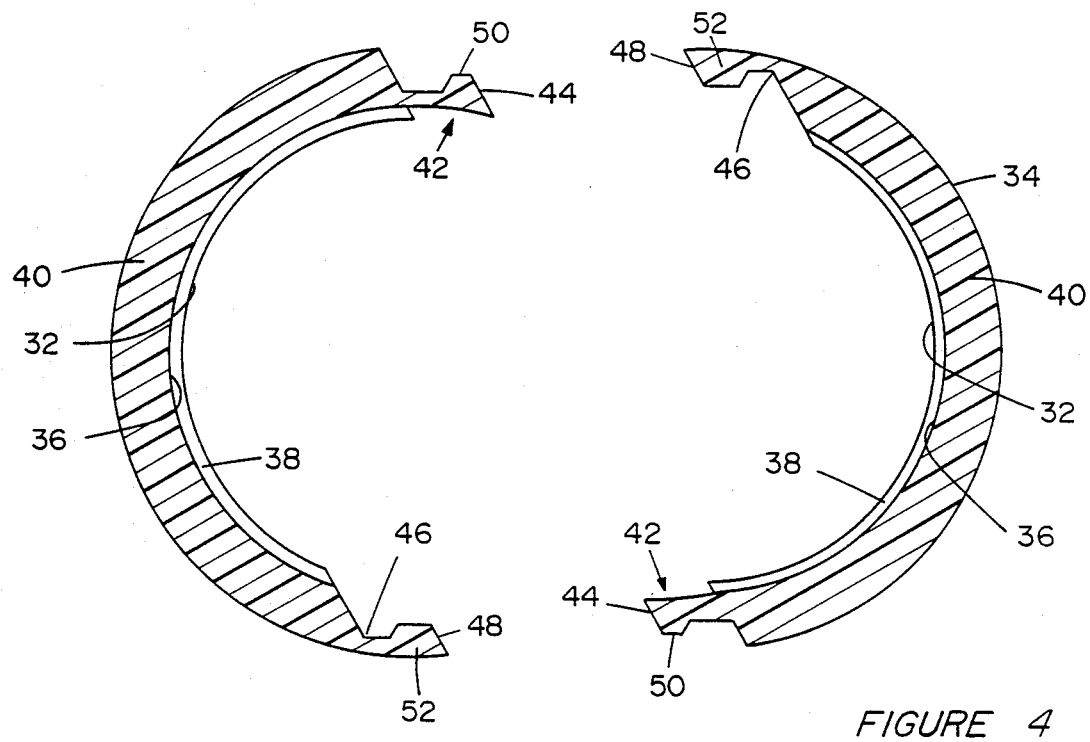
FIG. 4 is a transverse cross-section of the weight case illustrating a bivalve construction.
Figure 5:
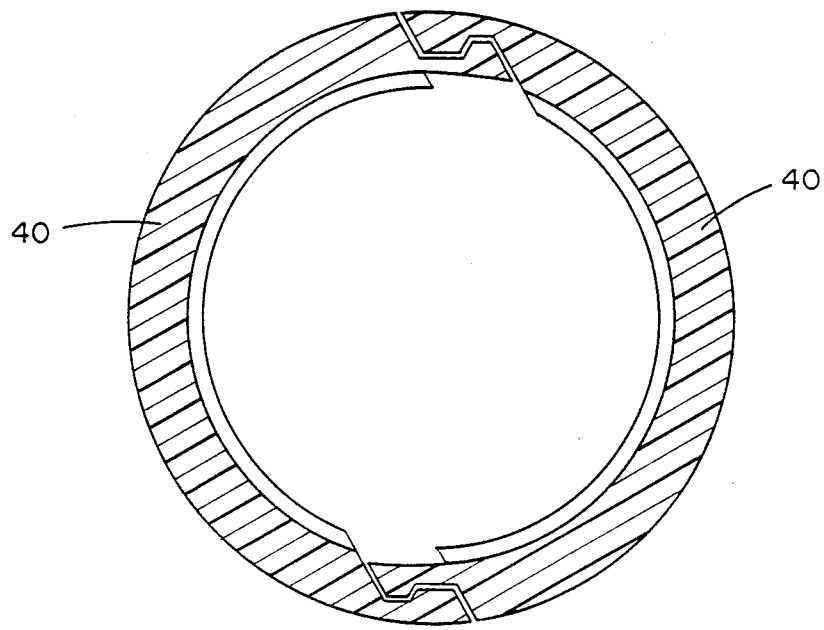
FIG. 5 illustrates the nature of the coupling between the bivalves.

FIG. 4 is a transverse cross-section of the weight case illustrating a bivalve construction. This figure best illustrates the manner in which the weight housing is attached and removed from the streamer cable section. Each valve 40 is substantially identical to the other. A valve 40 is slightly more than semicylindrical in form, having a clasp 42 extending from one edge 44 and a socket 46 defined inside the other edge 48. The clasp is located substantially within the central cylindrical portion 34 of the housing edge and has a ridge 50 at its outermost edge which is received within the socket 46. The valves 40 are coupled together about the streamer cable section by the pressure fit of the clasp within the other socket in each valve as shown in FIG. 5. A slot 52 is defined midway along the edge 48 to accept a tool used to depress the clasp to allow the clasp to be withdrawn, uncoupling the valves. To facilitate the coupling/uncoupling of the two valves, it is preferred that the housing be manufactured from a corrosion resistant material such as polypropolene homopolymer or other similar material. As mentioned earlier, the material may be molded about the ballast, placing an appropriate weight in each valve.

In operation, the amount of lead weight desired to be attached to the streamer cable is formed about the cable. The weights or ballast are in turn surrounded by each valve of the housing. It is suggested that the clasp of one valve be first placed in the socket of the other valve so as to form a hinge. The housing should be placed around the ballast on the cable and closed together, forcing the free clasp of one valve into the open socket of the other valve. It is preferred that the valve be closed at a point of the cable containing a bulkhead. This prevents the housing from slipping or sliding down the cable.

In the embodiment mentioned above where the ballast in incorporated within each valve, the step of first forming the ballast to the cable is dispensed with and the valves coupled about the cable at the location requiring the weight. It is clear that several such casings or housings may coupled next to each other along a length of the streamer cable to add the required amount of weight. To remove the streamlined housing, a tool such as a screwdriver or similar article is placed in slot 52, depressing the edge containing the clasp and disengaging the socket. Once the hinge is disengaged, the two valves may be opened.

My invention has been described with a certain degree of specificity. Variation will occur to those skilled in the art but which may be included within the scope and spirit of this invention which is limited only by the appended claims.

I claim as my invention:

1. An apparatus for balancing a seismic streamer cable, comprising:
   (a) a streamlined housing having a first and a second valve substantially identical to each other and coupled about the streamer cable, the first valve having a socket and a clasp adapted to receive a corresponding socket and clasp on the second valve to rigidly fasten the first and second valve together about the streamer cable; and
   (b) a weight secured about the streamer cable by the first and second valve.

2. The apparatus as defined in claim 1, wherein the weight secured about the streamer cable by the first and second valve is enclosed within and an integral part of each valve.

3. The apparatus as defined in claim 1, wherein the weight secured about the streamer cable by the first and second valve is a lead sheet disposed between the streamer cable and each valve.

4. The apparatus as defined in claim 1, wherein the clasp of each valve is retained within the socket of the other valve by compression, securing the housing about the streamer cable.

5. The apparatus as defined in claim 1, wherein the housing further comprises a first and a second tapered exterior surface for reducing flow-regime associated turbulence about the exterior of the housing as the streamer cable is towed through a body of water.

6. An apparatus for balancing a seismic streamer cable, comprising:
   (a) a weight formed about an exterior of the streamer cable;
   (b) a streamlined housing enclosing the weight and securing the weight to the streamer cable, the housing having an identical first and second valve coupled together about the streamer cable, each valve further comprising;
      (i) a semicylindrical tube having a low profile exterior and having a first and a second edge;
      (ii) a clasp defined on the first edge; and
      (iii) a socket defined in the second edge, wherein the clasp of each valve is received in the socket of the other valve when the first and second valve are coupled together.

7. An apparatus for securing ballast about an exterior of a seismic streamer cable, comprising:
   (a) a first and a second identical valve coupled about the streamer cable, each valve having a first and a second edge defining a clasp and a socket adapted to engage a corresponding structure in the other valve to secure the first and second valve about the streamer cable; and
   (b) a weight contained within each valve.

8. The apparatus as defined in claim 7, wherein each valve has a first and a second outwardly tapering exterior surface for producing laminar flow about the exterior of each valve.

9. The apparatus as defined in claim 8, wherein the outwardly tapering exterior surface does not exceed a ten degree slope.

10. The apparatus as defined in claim 7, wherein the weight contained within each valve is lead conformed generally to an overall shape of each valve.

11. The apparatus as defined in claim 7, wherein the clasp and socket in the first valve are detachably coupled to the socket and clasp in the second valve.

* * * * *